Patented Nov. 14, 1950

2,529,959

UNITED STATES PATENT OFFICE 2,529,959

PROCESS FOR QUICK FREEZING

John Lomholdt-Pedersen, Gentopte, Denmark

No Drawing. Application August 1, 1946, Serial No. 687,711. In Denmark January 31, 1945

5 Claims. (Cl. 62—173)

For the quick-freezing of larger quantities of animal and vegetable or synthetic nutrients, foodstuffs or the like aqueous goods, large receptacles and quantities of liquids are required for the freezing in liquids, besides which, after the termination of the freezing process, the goods must be subjected to a special blow-off process or centrifugal cleaning in order to remove the adherent freezing liquid. By the methods of freezing by air hitherto known, still larger space is required.

These drawbacks are remedied by the present invention. The characteristic of the invention consists therein that the freezing is performed in two stages, the goods in question being preliminarily quick-frozen in a neutral liquid, in such manner that an interior temperature below 0° C., and preferably below −5° C., is obtained in all particles of the goods, after which the freezing process is completed by means of cold air. During the quick-freezing in a liquid a hard shell, impenetrable by the liquid, is formed whereby there will be no loss of liquid and which will make the goods proof against suffering any further damage, as their liquid juices will remain inside the goods frozen. According to the invention, the freezing by air of the goods preliminarily frozen can next be performed in a tunnel with trapdoors in its upper part for the entering and removal of the goods, while a sloping bottom is arranged at its lower part with an outlet for the freezing liquid dripping from the goods during their passage through the tunnel, so that no other, special arrangement will be needed for the removal of the liquid, such as centrifugal machines or blow-off devices. The entire handling may be automatically performed without manipulations of any kind, from the moment of the goods entering the freezing tank until the ready-frozen goods are stored in cold-storage rooms. Large tanks and quantities of liquid, as required for freezing in liquid alone, will not be needed, and more comfortable facilities of conveying are attained as compared to what is practicable by methods hitherto known of freezing in liquids.

It is of advantage that the part of the freezing process performed by air be effected as rapidly as in any way possible, whereby the finest quality of goods will be attained. In view hereof it is, according to the invention, preferable to employ a gas of high specific heat as a circulating gas, for instance carbon dioxide, flue gases preferably cleaned of sulphur dioxide and other noxious or discolouring, especially organic components, if present. When a suitably low temperature of air is maintained, it will be achieved that the transmission of heat from air to goods will keep pace with the freezing occurring inside the goods. In the manner described an advantageous transmission of heat will be attained. Similar gases which do not contain oxygen, or gases with low contents of oxygen, may also be employed during the storage of goods frozen.

As is also the case where the complete quick-freezing process is performed only by means of liquids containing glycerine and alcohol, it is achieved by the process according to the invention that the goods in question, for instance meat, will to an essential degree maintain their flavour, aroma, colour and weight, in contradistinction to what is the case in goods frozen only by air. A proper utilization of space is attained by apparatuses according to the invention. The fact that the invention can be applied with existing freezing-by-air plants, will be of essential advantage, as such plants may be combined with plants freezing in liquids.

Having thus described my invention, what I claim is:

1. The process for the quick freezing of nutrients and foodstuffs, or similar food products containing aqueous liquids, which comprises: quickly freezing the food product to be frozen by subjecting said food product to a neutral, cold freezing liquid so that said food product is frozen throughout, all juice therein being thoroughly frozen, and the core of said food product is at a temperature below 0° C.; and then subjecting said completely frozen food product to further cooling below 0° C. by subjecting it to the cooling action of a current of a cold gas, thereby completing said freezing process.

2. The process of quick freezing as defined in claim 1, wherein said food product is frozen by said neutral, cold freezing liquid so that the temperature of the core thereof is below minus 5° C., and said completely frozen food product is thereafter cooled to a temperature below minus 5° C. by subjecting it to the cooling action of said current of a cold gas.

3. The process of quick freezing as defined in claim 1, wherein said completely frozen food product resulting from that step of the process wherein said food product is subjected to the freezing action of a neutral, cold freezing liquid, is further cooled below 0° C. by subjecting it to the cooling action of a current of a gas having a high specific heat.

4. The process of quick freezing as defined in claim 1, wherein said cold gas whose cooling action is utilized to cool said completely frozen food product below 0° C. contains carbon dioxide.

5. The process of quick freezing as defined in claim 1, wherein said cold gas whose cooling action is utilized to cool said completely frozen food product below 0° C. contains flue gases.

JOHN LOMHOLDT-PEDERSEN.

REFERENCES CITED

The following references are of record in the file of this patent:

UNITED STATES PATENTS

| Number | Name | Date |
|---|---|---|
| 2,102,506 | Bland | Dec. 14, 1937 |
| 2,263,452 | Birdseye | Nov. 18, 1941 |
| 2,308,486 | Bartlett | Jan. 19, 1943 |
| 2,385,140 | Knowles | Sept. 18, 1945 |